United States Patent Office 3,116,991
Patented Jan. 7, 1964

3,116,991
DESALKALINISATION OF GLASS
Pierre le Clerc and Paul Ehrmann, Paris, France, assignors to Compagnie de Saint-Gobain, Neuilly-sur-Seine, France
No Drawing. Filed May 25, 1960, Ser. No. 31,538
Claims priority, application France May 30, 1959
9 Claims. (Cl. 65—31)

This invention has for its object a process of desalkalinisation of glass without destroying the silicious network, and to the products obtained by this process.

The process according to the invention consists in bringing, and maintaining for a prolonged time, the glass in to contact with hot sulphuric acid or hot acid sulphate.

In these conditions the H ions of the sulphuric acid or of the acid sulphates are exchanged with the alkaline ions of glass.

The sulphuric acid used must contain some proportion of water, preferably less than 10%; above that proportion hydrolysis takes place and some of the silica of the glass is dissolved. The most favourable proportion of water seems to be of about 5%, the exchange between H ions and alkaline ions taking place quickly and without destruction of the silicious network.

The treatment temperature for desalkalinization by sulphuric acid is advantageously of 300–320° C. Under this temperature the ion exchange is slower, above it the sulphuric acid begins to boil.

$(NH_4)HSO_4$, $LiHSO_4$, $KHSO_4$ are examples of useful acid sulphates.

When acid sulphates are used, it is possible to work at a higher temperature than when sulphuric acid is used, that is between 350° and 400° C., so that the ion migration is quickened. It is remarkable, when these baths are used, that only H ions migrate in to the glass, while the ammonium and alkaline ions do not participate in the exchange reaction and remain fixed to the anion $SO_4^-$.

The acid sulphates used are more or less stable at the temperature of 350° C. and are partially transformed to pyrosulphates of the general formula $M_2S_2O_7$ where M is an univalent cation. The two compounds, the acid sulphate and the pyrosulphates, coexist at that temperature, in equilibrium. The corresponding pyrosulphates may be directly resorted to form the mixture by advantageously blowing moist air through the melted pyrosulphate so as to generate some acid sulphate in the bath.

In a general way, without a recourse to electrolysis, the hydrogen ions $H+$ diffuse in to the glass and, in the other direction, the $K+$ and $Na+$ contained in the glass migrate into the bath to be fixed on the anion $SO_4^-$.

This exchange reaction causes a loss of weight in the glass which varies, according to the amount of alkali in the glass, between 10 and 20%.

The analysis of the entirely transformed glass proves that the percentage of initial alkali in the glass is reduced by 90 to 95%. Only minute traces of silica are to be detected in the bath, which proves that the silicious network has not been seriously attacked by the exchange reaction.

The glass obtained can be subjected to a heat treatment to improve its mechanical, thermal and electric properties.

This heat treatment results in a new weight loss owing to the departure of some water contained in the glass following the migration of the hydrogen ions. When these hydrogen ions replace the $Na+$ or $K+$ ions of the glass (OH), groups are formed in place of the unbridged oxygen ions. The departure of water under the action of heat, at the expense of these OH groups, is followed by a rearrangement of the silicious network and a consolidation of the transformed glass. When the action of heat is progressive, an opaque body similar to porcelain is obtained which resists temperatures of 1450–1500° C.

The weight loss between 150 and 1100° of the transformed samples varies between 1 and 2%. About ⅔ of the water is eliminated between 150 and 600° and ⅓ between 600 and 1100° C.

When the temperature is raised very rapidly a body similar to multicellular glass, rich in silica and having a high softening point, is obtained from certain glasses.

*Example 1*

A plate of 3 mm. thickness of a glass containing 66.14% $SiO_2$—0.24% $SO_3$—0.025% $Fe_2O_3$—0.78% $Al_2O_3$—10.63% CaO—2.85% MgO—0.75% $Na_2O$ and 18.58% $K_2O$, is plunged during 40 hours in a bath of ammonium acid sulphate $(NH_4)SO_4H$ at 350° C.

This bath may be prepared by adding 66 gr. of ammonium sulphate $(NH_4)_2SO_4$ to 49 gr. of 95% $H_2SO_4$. This bath contains at 350° C. a high percentage of pyrosulphate $(NH_4)_2S_2O_7$.

The progression of the migration of hydrogen ions may be observed by measuring with a microscope the thickness of the opacified layer of glass. This thickness is of 100 microns after 3 hours and 400 microns after 12 hours.

The opal glass obtained contains 79.5% $SiO_2$—0.34% $SO_3$—0.05% $Fe_2O_3$—0.75% $Al_2O_3$—12.45% CaO—3.30% MgO—0.10% $Na_2O$—2.25% $K_2O$ and 1.36% undetermined $(H_2O)$. The weight loss of the glass is of 16.9%. This transformation of glass occurs by simple diffusion of the hydrogen ions without recourse to electric current.

*Example 2*

The potash glass of Example 1 was dipped for 80 hours at 320° C. in a bath of 95% sulphuric acid. After complete transformation, the external look was the same as before, but according to the analysis the percentage in $K_2O$ changed from 18.5% to 2.17% and the percentage in $Na_2O$ from 0.75% to 0.08%. The weight loss of the plate is of 15.6%. The external look of the glass is the same as in Example 1, the mechanism of the double decomposition being identical.

*Example 3*

The same potash glass was dipped for 70 hours at 350° C. in a bath of sodium bisulphate $NaHSO_4$. The opaque, entirely-transformed glass contains: 79.60% $SiO_2$—0.2% $SO_3$—0.09% $Fe_2O_3$—0.46% $Al_2O_3$—12.65% CaO—3.45% MgO—0.62% $Na_2O$—1.30% $K_2O$ and 1.3% undetermined $(H_2O)$.

Nearly all the $K+$ ions had been exchanged with the $H+$ ions while the $Na+$ ions contained in the bath had not participated to the migration. The weight loss is 16.9%.

*Example 4*

A plate 3 mm. thick of a soda glass containing 70.23% $SiO_2$—0.24% $SO_3$—0.34% $Al_2O_3$—0.03% $Fe_2O_3$—11.63% CaO—4.44% MgO—13.03% $Na_2O$ and 0.06% $K_2O$—is dipped at 350° C. for 220 hours in a bath of ammonium acid sulphate. The opaque product obtained contains but 0.10% $Na_2O$ and 0.18% $K_2O$. The silica content has been raised to 81.4% and MgO to 5.5%. The weight loss is of 12.9%. The formula of the glass obtained is $5SiO_2$, $1CaO$, $½MgO$.

*Example 5*

Plates 3 mm. thick made of a glass containing together soda and potash, that is 59.85% $SiO_2$—0.102% $SO_3$—0.20% $Fe_2O_3$—5.80% $Al_2O_3$—5.75% CaO—3.45% MgO—16.70% $Na_2O$—6.90% $K_2O$ and 1.26% $B_2O_3$—are treated during 6 hours in a bath of ammonium acid sulphate at 350° C. In view of the relatively high content of alkali of this glass, the rate of migration of the H+ ions is fast: in 1 hour the opaque film is of about 400 microns thickness. The glass completely transformed has the following composition:

75.15% $SiO_2$—0.30% $SO_3$—0.20% $Fe_2O_3$—5.80% $Al_2O_3$—6.75% CaO—4.20% MgO—0.26% $Na_2O$—3.20% $K_2O$—1.47% $B_2O_3$ and 1.32% undetermined ($H_2O$).

The weight loss is of 20.59%. The composition of the transformed glass approximates that of porcelain, which is an aluminum silicate containing a little lime (4%) magnesia (4%) and $K_2O$ (1–2%). If we start from a glass containing more alumina and less lime, we can obtain a better correspondence.

Example 6

When the opaque, entirely-transformed glass, prepared according to Example 1, is brought slowly and progressively to a temperature of 1100° C. (rate 100° C./hour for example), an opaque plate is obtained which is similar to porcelain but with better mechanical and electric properties.

The new weight loss, corresponding to a water departure, is 1.3% and the apparent density is 2.44 against 2.50 for the starting glass.

This plate resists a prolonged heating at 1450° C. without deformation nor flowing.

Example 7

When opaque plates prepared according to Example 5 are introduced directly in an oven brought to a temperature of 700 to 1100° C., the water departure is accompanied by a swelling and the production of multicellular glass which can sustain later on a temperature of 1450° C. The new weight loss is 1.12% and the apparent density which is 2.52 for the initial glass, after treating and heating to 1100° C. is of about 0.5.

What is claimed is:

1. A method of desalkalinizing glass that comprises immersing glass containing silica and alkali metal oxide in a bath containing some but not substantially more than 10% water and having, as its essential, constituent anion, the radical $SO_4$— and, as an essential, constituent cation, H+, which cation is derived from the group consisting of concentrated sulfuric acid and acid sulphates, at a temperature of about 300 to 400° C. for a time sufficient to produce a substantial exchange of H+ for M+ in the glass, M being alkali metal.

2. A method according to claim 1 in which the product is washed, dried, and heated to at least 700° C. and less than about 1400° C. until it loses weight and decreases in density.

3. A process according to claim 1 in which the glass is treated by hot concentrated sulfuric acid.

4. A process according to claim 3 in which the temperature of the sulfuric acid is about 300 to 320° C.

5. A process according to claim 3 in which the sulfuric acid contains about 5% of water.

6. A process according to claim 1 in which the glass is treated with molten acid sulphates.

7. A process according to claim 6 in which the temperature of the acid sulphate is about 350 to 400° C.

8. A process according to claim 6 in which the acid sulphates are obtained by blowing steam into molten pyrosulphates.

9. A process according to claim 1 which comprises heating the desalkalinized glass to a temperature of at least 700° C. and less than about 1400° C. and thereby improving its refractory characteristics.

References Cited in the file of this patent

UNITED STATES PATENTS

| | | |
|---|---|---|
| 2,106,744 | Hood et al. | Feb. 1, 1938 |
| 2,205,180 | Shaver | June 18, 1940 |
| 2,336,227 | Dalton | Dec. 7, 1943 |
| 2,500,092 | Parker | Mar. 7, 1950 |
| 3,061,495 | Alford | Oct. 30, 1962 |

OTHER REFERENCES

Williams et al.: Glass Industry, July, 1945, "Surface Dealkylization of Finished Glassware," pp. 324–326 and 339, 341, 342, 344.